United States Patent

Wakahara

[11] Patent Number: 5,247,857
[45] Date of Patent: Sep. 28, 1993

[54] CONTROL ARRANGEMENT FOR AUTOMATIC AUTOMOTIVE TRANSMISSION

[75] Inventor: Tatsuo Wakahara, Kawasaki, Japan

[73] Assignee: Nissan Motor Co., Ltd., Yokohama, Japan

[21] Appl. No.: 792,270

[22] Filed: Nov. 18, 1991

[30] Foreign Application Priority Data

Nov. 21, 1990 [JP] Japan .................. 2-316808

[51] Int. Cl.$^5$ .............................................. B60K 41/18
[52] U.S. Cl. ...................................... 74/866; 475/118
[58] Field of Search ............. 475/118, 120, 121, 122, 475/123, 149, 151, 153, 199; 74/856, 866

[56] References Cited

U.S. PATENT DOCUMENTS

| 4,319,501 | 3/1982 | Sugimoto | 74/866 |
| 4,644,826 | 2/1987 | Kubo et al. | 74/866 |
| 4,648,289 | 3/1987 | Kubo et al. | 74/866 |
| 4,704,922 | 11/1987 | Suketomo et al. | 475/120 X |
| 4,803,901 | 2/1989 | Hamano et al. | 74/866 X |
| 4,843,909 | 7/1989 | Hasegawa et al. | 475/123 X |
| 4,885,960 | 12/1989 | Maeda et al. | 74/866 |
| 5,012,698 | 5/1991 | Hayasaki | 74/866 |
| 5,016,174 | 5/1991 | Ito et al. | 74/866 X |
| 5,088,353 | 2/1992 | Yoshida | 74/866 |
| 5,097,723 | 3/1992 | Hayasaki | 74/866 |
| 5,097,724 | 3/1992 | Braun | 74/866 |
| 5,113,722 | 5/1992 | Iizuka | 74/866 |

FOREIGN PATENT DOCUMENTS

0398341 11/1990 European Pat. Off. ............ 475/121
2-51657 2/1990 Japan .

*Primary Examiner*—Rodney H. Bonck
*Assistant Examiner*—Ryan W. Massey
*Attorney, Agent, or Firm*—Foley & Lardner

[57] ABSTRACT

In order to attenuate the occurrence of a double select shock which results from the use a first one-way clutch which is used in a first gear train and is involved in the generation of lowest speed thereof, and a second one-way clutch in an auxiliary gear train which is arranged between the main gear train and the final drive, the vehicle speed is sensed and while it is below a predetermined low value, a friction element which is arranged in parallel with the second one-way clutch is engaged. Above the predetermined low value the friction element engagement is maintained in the event that an engine braking demand signal is present.

5 Claims, 5 Drawing Sheets

FIG.2

| | C1 | C2 | C3 | B1 | OWC1 | B2 | C4 | B3 | OWC2 | GEAR | $a_1=0.45$<br>$a_2=0.45$<br>$a_3=0.45$ |
|---|---|---|---|---|---|---|---|---|---|---|---|
| 1ST SPEED | | | ◯ | ◌ | ◯ | | | ◌ | ◯ | $\dfrac{1+a_2}{a_2} \times (1+a_3)$ | 4.67 |
| 2ND SPEED | | ◯ | ◯ | | | ◯ | | ◌ | ◯ | $\dfrac{a_1+a_2}{a_2 \times (1+a_1)} \times (1+a_3)$ | 2.00 |
| 3RD SPEED | | ◯ | ◯ | | | | | ◌ | ◯ | $(1+a_3)$ | 1.45 |
| 4TH SPEED | | ◯ | | | | | ◯ | | | 1.00 | 1.00 |
| 5TH SPEED | | | | | | ◯ | ◯ | | | $\dfrac{1}{1+a_1}$ | 0.69 |
| REVERSE | ◯ | | | | | | | | ◯ | $-\dfrac{1}{a_1} \times (1+a_3)$ | -3.22 |

◌ USED DURING ENGINE BRAKING

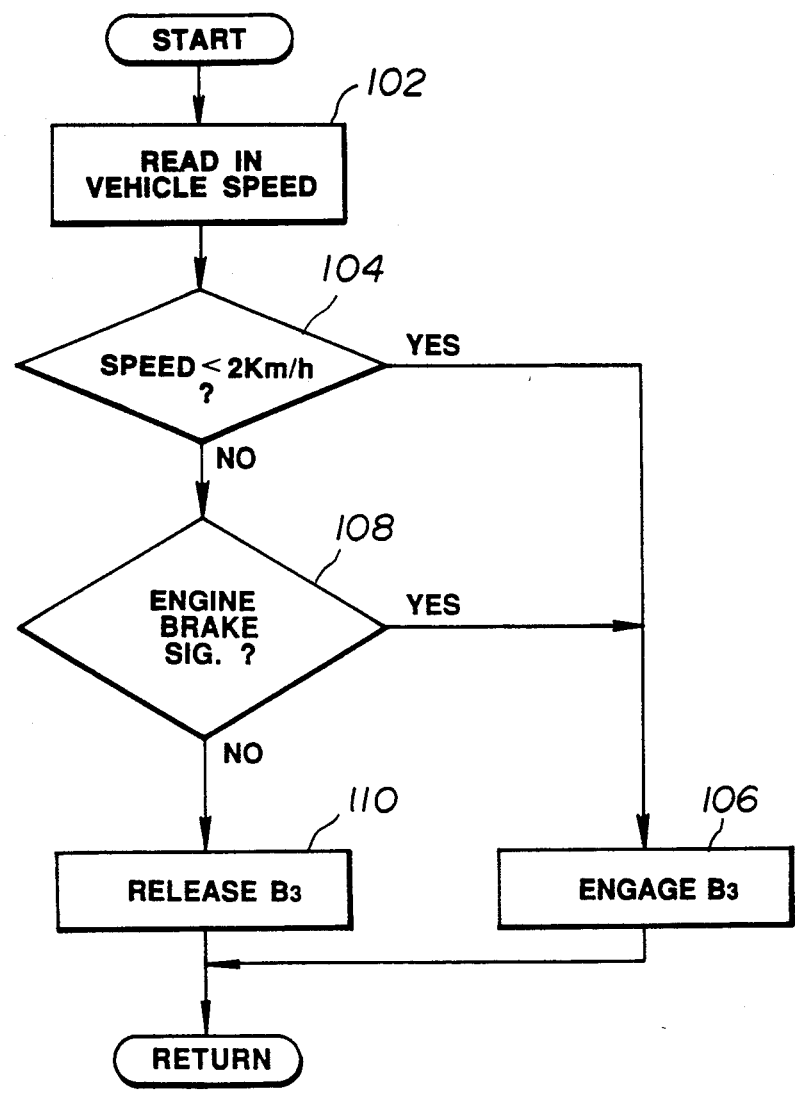

CONTROL ARRANGEMENT FOR AUTOMATIC AUTOMOTIVE TRANSMISSION

BACKGROUND OF THE INVENTION

1. Field of the Invention

The present invention relates generally to automatic transmissions and more specifically to a control arrangement which facilitates engine braking control.

2. Description of the Prior Art

JP-A-2-51657 discloses an automatic transmission which includes a main four speed main gear train and an auxiliary gear train which can be selective switched between high and low gears. In combination, the main and auxiliary gear trains are arranged to produce 5 forward speeds and one reverse. In order to implement the lowest gear of the main gear train, use is made of a first one-way clutch.

The auxiliary transmission includes a clutch, a brake and a second one-way clutch. When the clutch is engaged the planetary gear assumes a directly engaged condition and produces a speed change ratio of 1. When the clutch is released and the brake (if engaged) or the second one-way clutch are placed under load, a reduction gear condition is established.

The above type of main and auxiliary gear train combinations normally suffer from the problem that when a N-D select is made, the one-way clutches of the main and auxiliary gear trains engage one after the other and produce a two stage shock which deteriorates the select feeling.

In order to prevent double shock problem it has been proposed to engage the brake which is arranged in parallel with the one-way clutch of the auxiliary gear train. That is to say, the brake is initially conditioned to an engaged state so that the one-way clutch is prevented from engaging when a N-D select is made and thus reduces the number of shocks to one.

When the above measure of initially engaging the brake of the auxiliary gear train is employed, the main gear train is provided with a forward one-way clutch in addition to the one-way clutch and is arranged to transmit torque from the engine during forward speeds (with over-drive inhibited). This forward one-way clutch is arranged in parallel with an overrunning clutch the transmission can be selectively switched between a condition wherein engine braking is produced and a condition wherein engine braking is not produced. As a result of this, irrespective of the fact that the brake of the auxiliary gear train is engaged transmission can be selectively conditioned to produce engine braking or non-engine braking conditions.

However, when the main gear train is not provided with the additional forward one-way clutch and the brake of the auxiliary gear train is engaged, switching between engine braking and non-engine braking modes is not possible.

SUMMARY OF THE INVENTION

It is an object of the present invention to provide a control arrangement via which engine braking can be selectively produced and which obviates the double shock problem which results from the use of a one-way clutch in both of the main and auxiliary gear trains.

In brief, the above object is achieved by an arrangement wherein the vehicle speed is sensed and while it is below a predetermined low value, a friction element which is arranged in parallel with the second one-way clutch is engaged. Above the predetermined low value the friction element engagement is maintained in the event that an engine braking demand signal is present.

More specifically, the present invention is deemed to come in a transmission which features: a first gear train capable of selectively producing a plurality of forward speeds, said first gear train having an output shaft; a second gear train which is operatively connected with the output shaft of the first gear train and which includes: a hydraulically operated low speed friction element; a one-way clutch which is arranged in parallel with the low speed friction element; said second gear train being arranged so that when it is conditioned to produce its lowest gear ratio, one of said low speed friction element and the one-way clutch transmits torque; vehicle speed sensor means; and means for comparing the vehicle speed with a predetermined value at the time a select is made and for engaging the low speed friction element when the vehicle speed is below the predetermined value.

BRIEF DESCRIPTION OF THE DRAWINGS

FIG. 2 is a table showing the manner in which selective engagement of a plurality of friction elements included in the FIG. 1 transmission produces five forward speeds and one reverse;

FIG. 5 is a flow chart depicting the steps executed by a control routine which characterizes the present invention.

DETAILED DESCRIPTION OF THE PREFERRED EMBODIMENTS

Figure 1:
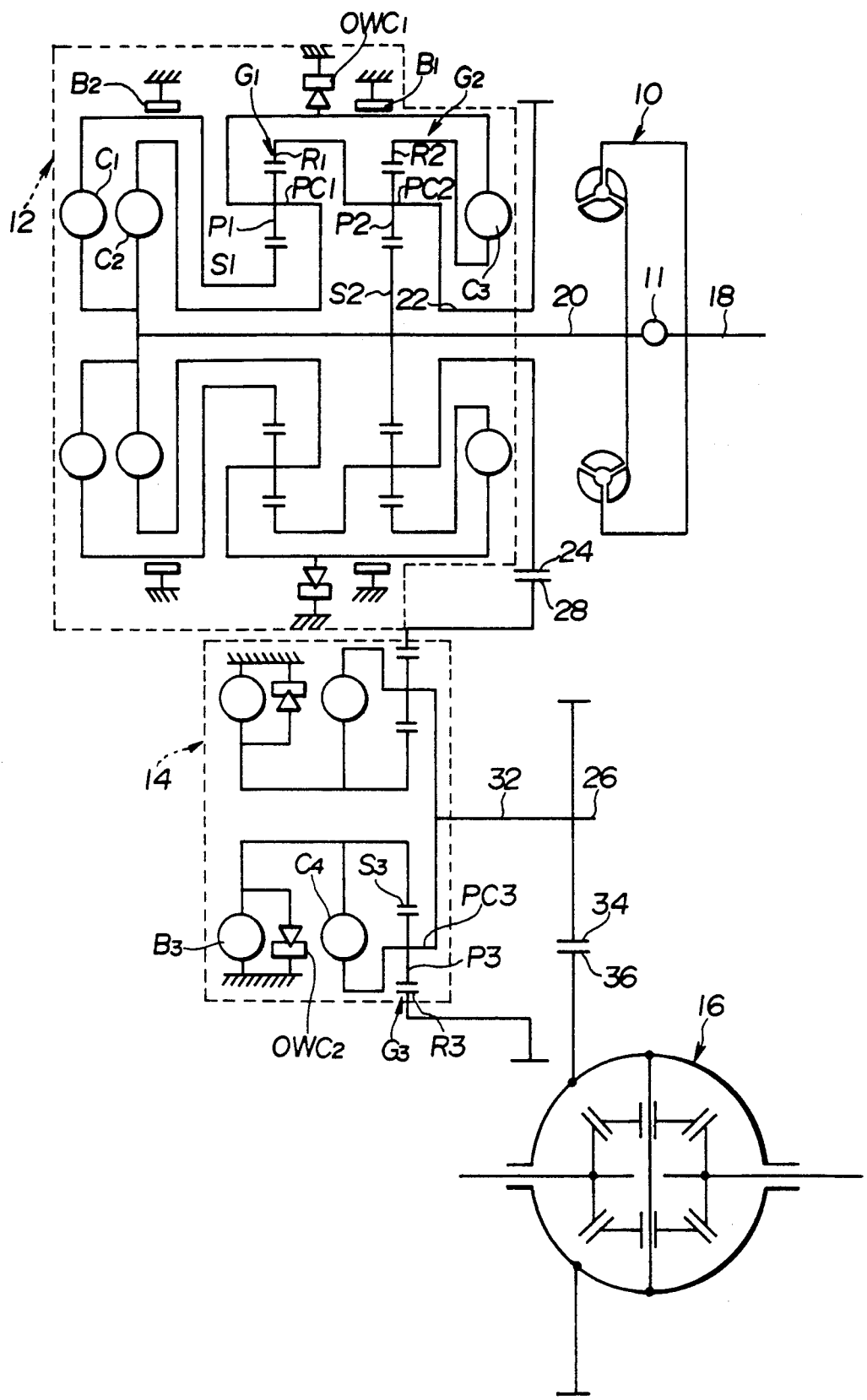
FIG. 1 is a schematic drawing showing a transmission of the nature to which the present invention is applied.

FIG. 1 schematically shows a transmission to which the present invention is applied. This transmission includes a fluid coupling device 10, a main gear train 12, an auxiliary gear train 14 and a differential unit 16. The fluid coupling comprises a torque converter which includes a Jock-up clutch/device 11. A non-illustrated engine is placed in driving connection with the torque converter by way of a drive shaft 18. The rotation energy which is input to the torque converter is delivered to a shaft 20 which defines an input shaft of the main gear train. As shown, the shafts 18 and 20 are arranged so as to be coaxial.

The main gear train comprises first and second planetary gear sets G1, G2. The first gear set G1 includes a sun gear S1, an internal ring gear R1, pinon gears P1 which mesh with and operatively connect the sun and internal ring gears S1, R1, and a pinion carrier PC1. The second gear set G2 includes a sun gear S2, an internal ring gear R2, pinon gears P2 which mesh with and operatively connect the sun and internal ring gears S2, R2, and a pinion carrier PC2. The main gear train further includes first, second and third clutches C1, C2 and C3; first and second brakes B1, B2; and a one-way clutch OWC1.

As will become apparent hereinafter, by selectively engaging/disengaging the above listed five hydraulically controlled friction elements (C1, C2, C3, B1 & B2)

and the one way clutch OWC1 it is possible to induce the main gear train to provide an operative connection between the input shaft 20 and an output shaft 22 in a manner which enables the generation of four forward speeds (including overdrive) and one reverse.

The output shaft 22 of the main gear train is arranged parallel with the input shaft 20 and arranged to be synchronously rotatable with an output gear 24. This gear meshes with an input gear 28 of the auxiliary gear train 14. The gear ratio which is developed between the gears 24, 28 can of course be varied.

The auxiliary gear train 14 includes a third planetary gear set G3 a fourth clutch C3, a third brake B3 and a second one way clutch OWC2. The third gear set comprises a sun gear S3, an internal ring gear R3, pinon gears P3 which mesh with and operatively connect the sun and internal ring gears S3, R3, and a pinion carrier PC3. In this case the internal ring gear R3 is formed so as to be synchronously rotatable with the input gear 28 while the carrier PC3 is arranged to be synchronously rotatable with an output shaft 32 and about an axis which is coincident with an axis 26 about which is a final pinion 34 is rotatable.

The fourth clutch C4 is arranged to enable a selective connection between the carrier PC3 and the internal sun gear S3. The third brake B3 is arranged to hold the sun gear S3 stationary while the second one-way clutch OWC2 is arranged in parallel with the third brake B3. The shaft 32 is arranged to be synchronously rotatable with the final pinion 34 which as shown is arranged to mesh with a final gear 36 which forms part of the differential unit 16.

The above described transmission is such as to be able to produce 5 forward speeds and one reverse. By engaging the clutches and brakes in the manner tabled in FIG. 2 it is possible to induce the five forward speeds and one reverse. At this point it should be noted that in FIG. 2 the circles denote elements which are engaged and the one-way clutches which are exposed to torque. The a1, a2 and a3 values respectively denote the ratio of the number of teeth on the internal ring gears R1–R3 to the number of teeth on the sun gears S1–S3. Further the rotational ratios which occur between shafts 32 and 20 represent each of the five forward and one reverse speed produced by the transmission.

In connection with fourth and fifth speeds the auxiliary gear train 14 is such that the fourth clutch C4 is engaged while the third brake B3 is released. Under these conditions the auxiliary gear train is conditioned for direct drive and produces a gear ratio of 1. Viz., the rotational speed of the input gear 28 and the output shaft 32 are the same.

On the other hand, during first—third (1~3) speeds and reverse the auxiliary gear train is conditioned so that the fourth clutch C4 is released and the third brake C3 (or alternatively, the second one-way clutch OWC2) is engaged. Under these conditions a reduction in rotational speed occurs between the input gear 28 and the output shaft 32. For example, in the case that the ratio of the teeth on the internal ring gear R3 and the sun gear S3 is 0.45 the auxiliary gear train produces a gear ratio of 1.45. This means that, as shown in FIG. 2 the gear ratio which is developed between shafts 20 and 32 becomes the gear ratio of the main gear train divided by 1.45.

Figure 3:
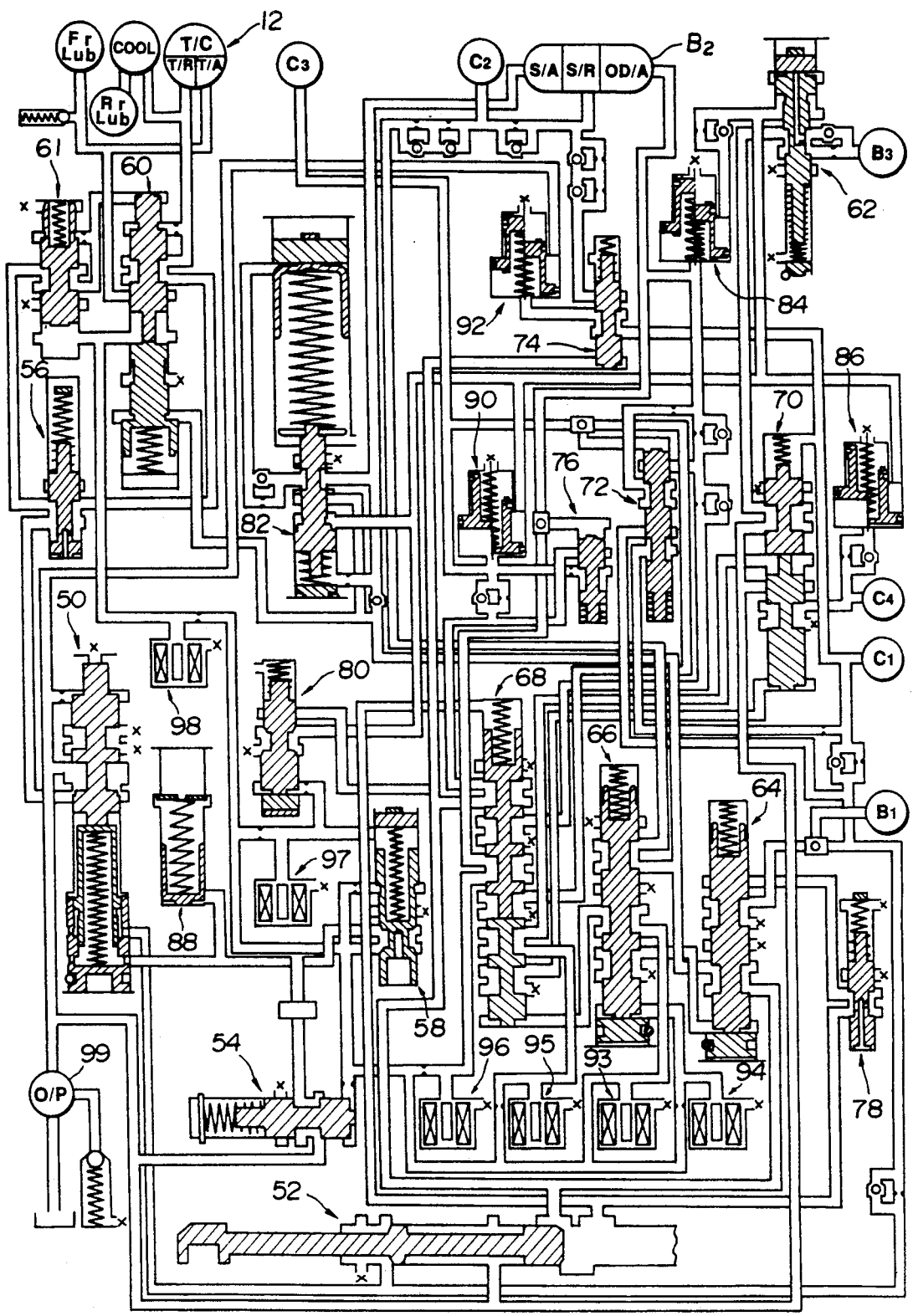
FIG. 3 shows a hydraulic control circuit which is used to control the engagement of the above mentioned plurality of friction elements.

FIG. 3 shows a hydraulic control circuit which is used to control the friction elements of the transmission. This circuit includes a pressure regulator valve 50, a manual valve 52, a pilot valve 54, a torque converter supply pressure valve 56; a pressure modifier valve 58, a lock-up control valve 60, a lock-up assist valve 61, a reduction control valve 62, a 1-2 shift valve 64, a 2-3 shift valve 66, a 3-4 shift valve 68, a 4-5 shift valve 70, and OD timing valve 72, an accumulator shift valve 74, a forward clutch timing valve 76, a first speed fixed range pressure reduction valve 78, an accumulator control valve 80, a 1-2 accumulator valve 82, an OD accumulator 84, a direct drive accumulator 86, a modifier accumulator 88, an N-D accumulator 90, a servo release accumulator 92, shift solenoids 93, 94 and 95, a timing solenoid 96, a line pressure solenoid 97 and a lock-up solenoid 98. In addition to the above the circuit further includes and/or is associated with an oil pump 99, the torque converter 12 (note that this device includes a lock-up clutch 11 having an apply chamber T/A and a release chamber T/R), the clutches C1, C2 and C3, the brakes B1, B2 and B3 (note that the brake B2 has an apply chamber S/A, a release chamber S/R and an OD apply chamber OD/A).

With this arrangement in response to vehicle speed and throttle opening degree, the clutches and brakes are appropriately supplied with hydraulic fluid.

Figure 4:
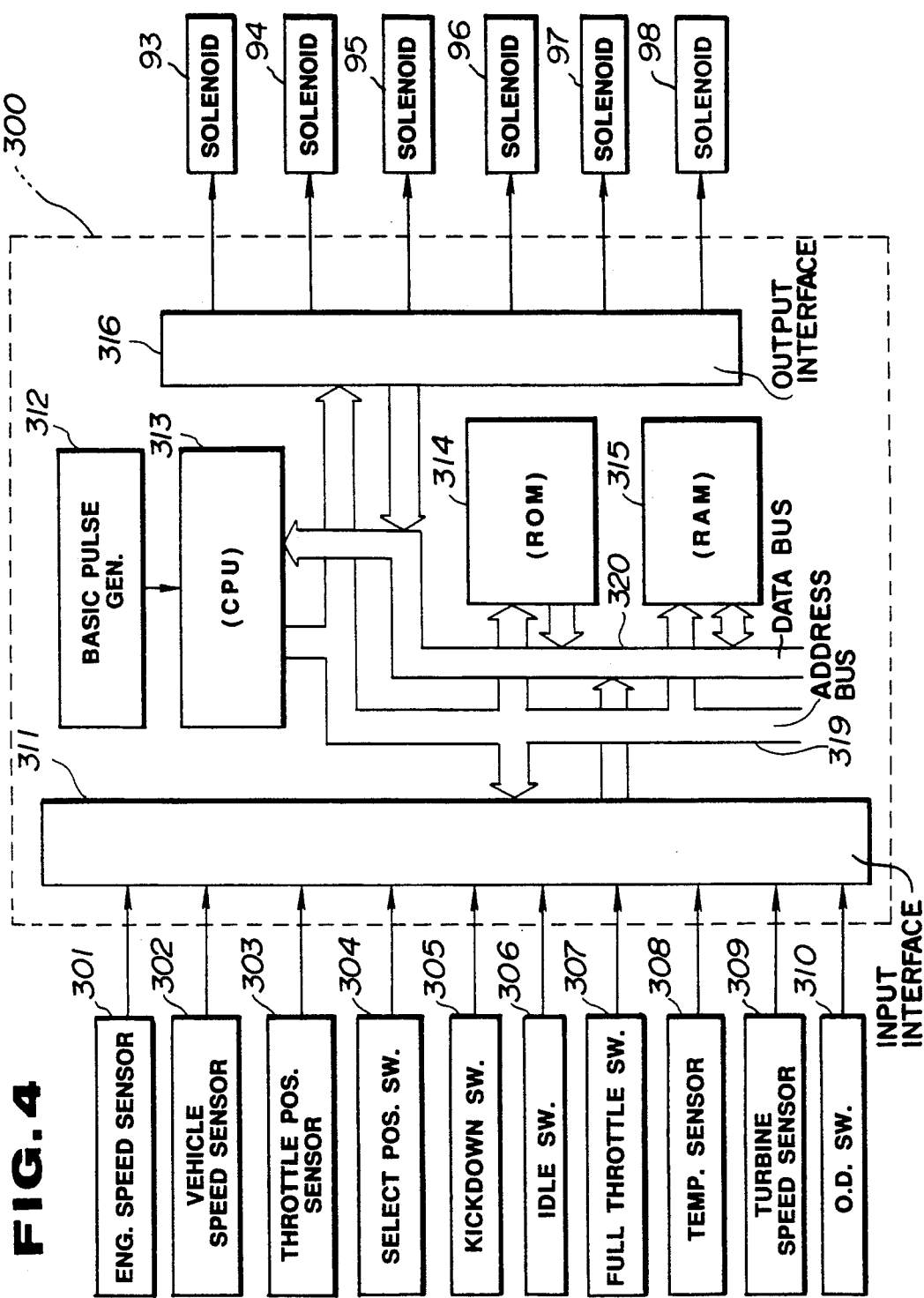
FIG. 4 is a block diagram showing a sensor/control unit configuration which is used to control a plurality of solenoids included in the circuit shown in FIG. 3.

FIG. 4 shows the manner in which the solenoids 93, 94, 95, 96, 97 and 98 are operatively connected with a control unit 300. This control unit 300 includes an input interface 311, a basic pulse generator (clock pulse generator) 312, a CPU 313, a ROM 314, a RAM 315, and an output interface 316. An address bus 319 and a data bus 320 provide an operative connection between the above listed elements. This control unit 300 is arranged to receive data input from an engine speed sensor 301, a vehicle speed sensor 302, a throttle opening degree sensor (viz., and engine load sensor) 303, a select position switch 304, a kickdown switch 305, and idle switch 306, a full throttle switch 307, an oil temperature sensor 308, a turbine rotational speed sensor 309, and an overdrive (OD) switch 310. The ROM contains programs which are designed to read in the data from the above mentioned sensors and switches, and derive various control instructions via which the control signals which are supplied to the above mentioned solenoids 93, 94, 95, 96, 97 and 98 are generated and output via the output interface 316.

The control of the third brake B3 of the auxiliary gear train 14 is determined by a control routine of the nature depicted in flow chart form in FIG. 5.

In the first step of this routine (step 102) the instant vehicle speed is sampled and read in. Next at step 104 the vehicle speed is compared with a predetermined value (e.g. 2 Km/Hr). In the event that this comparison shows that the vehicle speed is below the given limit the routine goes to step 106 wherein a command to engage brake B3 is issued. On the other hand, if the vehicle speed is above the given limit the routine goes to step 108 wherein it is determined if an engine braking demand signal is present or not. This signal can be based on the select lever being set in 2 Range or the like wherein engine braking is demanded, or the select lever set in D Range and throttle close to fully closed.

In the event that an engine braking demand signal is found to be present, the routine goes to step 106. On the other hand, in the event of a negative finding the routine proceeds to step 110 wherein a command to release the third brake B3 is issued.

Thus, as will be appreciated in the event that either the vehicle speed being below a predetermined value or the presence of an engine brake demand signal being detected the third brake B3 is engaged.

With the above type of control, in the event that the vehicle is at standstill by way of example and a N-D select is made, the third brake B3 will be engaged. As a result when the one-way clutch OWC1 of the main gear train 12 engages only the generation of a single shock will be generated as the engagement of the second one-way clutch OWC2 of the auxiliary gear train is prevented by the prior engagement of the brake B3. After the vehicle has moved off and a predetermined speed has been obtained, the third brake B3 is released. However, in the event that a N-2 Range select is made, or the select lever is moved from D to 2 Range, the third brake B3 will remain engaged or become reengaged due to the generation of an engine braking demand signal.

What is claimed is:

1. In a transmission
   a first gear train capable of selectively producing a plurality of forward speeds, said first gear train having an output shaft
   a second gear train which is operatively connected with the output shaft of the first gear train and which includes:
   a hydraulically operated low speed friction element;
   a one-way clutch which is arranged in parallel with the low speed friction element;
   said second gear train being arranged so that when it is conditioned to produce its lowest gear ratio, one of said low speed friction element and the one way clutch transmits torque;
   vehicle speed sensor means; and
   means for comparing the vehicle speed with a substantially low predetermined speed value at the time a select is made and for engaging the low speed friction element when the vehicle speed is below the predetermined value, such that when a Neutral to Drive select is made the transmission undergoes only a single shift shock and double shift shock is prevented.

2. The transmission as claimed in claim 1, wherein the single shock is generated by the engagement of a first one-way clutch positioned in the first gear train, and engaging the low speed friction element when the vehicle speed is below the predetermined value prevents engagement of the one-way clutch in the second gear train, thereby preventing double shift shock.

3. A transmission as claimed in claim 5 wherein said second gear train further comprises:
   a planetary gear set;
   a clutch which is arranged to selectively connect two of the elements of said planetary gear set when a high speed ratio is required, and wherein said hydraulically operated low speed friction element is a brake which selectively inhibits rotation of one of the elements of said planetary gear set.

4. A transmission as claimed in claim 3 further comprising:
   means for detecting a demand for engine braking; and
   means for maintaining said low speed friction element engaged in response to a demand for engine braking being detected.

5. The transmission as claimed in claim 1, wherein said substantially low predetermined value is 2 Km/h.

* * * * *